(12) United States Patent
Kennedy et al.

(10) Patent No.: US 7,105,821 B1
(45) Date of Patent: Sep. 12, 2006

(54) THERMALLY STABILIZED RADIATION DETECTOR UTILIZING TEMPERATURE CONTROLLED RADIATION FILTER

(75) Inventors: Adam M. Kennedy, Santa Barbara, CA (US); Todd Sessler, Goleta, CA (US); Robert K. Dodds, Santa Barbara, CA (US); David VanLue, Santa Barbara, CA (US); Dmitry Shmoys, Los Angeles, CA (US); John Steven Anderson, Santa Monica, CA (US); Jim Andrew, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 240 days.

(21) Appl. No.: 10/736,913

(22) Filed: Dec. 15, 2003

(51) Int. Cl.
*G01J 3/50* (2006.01)
(52) U.S. Cl. .................................. 250/339.07
(58) Field of Classification Search ........... 250/339.07, 250/226, 216, 339.04, 339.02
See application file for complete search history.

(56) References Cited

U.S. PATENT DOCUMENTS

| | | | |
|---|---|---|---|
| 4,479,367 A | 10/1984 | Buller | 62/514 R |
| 4,820,923 A | 4/1989 | Wellman | |
| 5,399,897 A | 3/1995 | Cunningham et al. | 257/467 |
| 5,688,699 A | 11/1997 | Cunningham et al. | 437/3 |
| 5,708,269 A | 1/1998 | Meissner et al. | 250/332 |
| 5,777,329 A * | 7/1998 | Westphal et al. | 250/339.02 |
| 5,808,350 A | 9/1998 | Jack et al. | 257/440 |
| 6,064,066 A * | 5/2000 | Bevan et al. | 250/345 |
| 6,122,919 A | 9/2000 | Patel et al. | 62/51.1 |
| 6,133,569 A * | 10/2000 | Shoda et al. | 250/332 |
| 6,144,031 A * | 11/2000 | Herring et al. | 250/352 |
| 6,222,454 B1 * | 4/2001 | Harling et al. | 340/584 |
| 6,326,611 B1 | 12/2001 | Kennedy et al. | 250/239 |
| 6,946,644 B1 * | 9/2005 | Wood | 250/226 |

OTHER PUBLICATIONS

"Infrared System Engineering", Hudson, Jr., Richard D., JOhn Wiley & Sons, New York, pp. 351-354.
"Optical system for a wide field of view staring infrared sensor having improved optical symmetry", Wellman, William H. et al., U.S. Appl. No. 10/423,504, filed Apr. 25, 2003.

\* cited by examiner

*Primary Examiner*—Otilia Gabor
(74) *Attorney, Agent, or Firm*—Wiliam C. Schubert; Karl A. Vick

(57) ABSTRACT

A radiation detector 10 has a base 12 and a window 16 that define a vacuum chamber 20. Within the vacuum chamber 20 is a temperature controlled filter 32 and a focal plane array (FPA) 22 defining a gap h therebetween. The filter 32 is heat sunk to a readout integrated circuit (ROIC) 24 and thermoelectric elements 28 to inhibit heat transfer from non-scene sources 38, 40 to the FPA 22. The temperature controlled filter 32 may also incorporate a bandpass filter to reflect all sources of radiation not within the desired wavelength region of interest. The temperature controlled filter 32 is maintained at substantially the same temperature as the FPA 22.

22 Claims, 10 Drawing Sheets

Figure 1: Prior Art

THERMALLY STABILIZED RADIATION DETECTOR UTILIZING TEMPERATURE CONTROLLED RADIATION FILTER

TECHNICAL FIELD

These teachings relate generally to radiation detectors or bolometers such as infrared detectors that employ thermal sensors operating on a photoresistive effect. The present invention is particularly directed to a filter disposed within a vacuum chamber of such a detector, and especially to the thermal and spatial relation between a sensor of the detector and such a filter.

BACKGROUND

Radiation detectors such as microbolometers operating at ambient temperatures operate by measuring a change in a sensor's resistance (typically a focal plane array FPA of sensors) caused by the heating effect of incident radiation. The desired radiation to measure at the FPA is referred to as scene radiation, whereas any other energy transfer to the FPA is referred to as non-scene radiation. Depending upon the type of sensor, certain non-scene radiation may register at the FPA as noise.

Both cryogenically cooled and uncooled (i.e.: not cryogenically cooled) detectors typically dispose a radiation sensor within a vacuum chamber or detector package that maintains pressures well below ambient levels. The vacuum chamber itself is generally defined by a window through which desired radiation passes, a base, and sidewalls. However, the two types of detectors employ different types of sensors.

Cryogenically cooled detectors employ photon sensors that measure electrical activity directly from incident radiation. An incident photon striking a photon sensor collides with a target that directly amplifies the incident photon by an avalanche or cascade process that generates a multiplicity of charge carriers that are detected as electrical entities in themselves. The same principal applies to ionized gas in a tube or solid state detectors that are cryogenically cooled. A photon sensor operates on a photoconductive effect and generates a photoconductive current.

Conversely, uncooled detectors such as bolometers employ thermal sensors whose resistance changes as a function of temperature. An external current applied across the thermal sensor is used to measure a change in electrical resistance through the sensor that results from absorbing heat from the incident radiation. A thermal sensor operates on a photoresistive effect and generates a photoresistive current. Examples of uncooled infrared detectors include Raytheon® thermal camera models 300D and 2000B and component detectors 2500AS and 2000AS. Thermal detectors are susceptible to package effects, which include heat from package walls (the confines of the vacuum chamber) interfering with sensing of incident radiation.

Typically, a FPA of thermal sensors is mounted to or fabricated on a readout integrated circuit (ROIC). Heat that accumulates in the FPA from scene and non-scene radiation is removed by a series of thermoelectric (TE) cooling elements or other heat extraction means, which may be within or outside of the vacuum chamber. A ceramic stage is disposed between the TE elements and the ROIC in order to provide structure for the TE cooling elements, and to ensure a sufficient thermal mass to minimize localized temperature spikes from non-scene radiation and to distribute non-localized temperature changes over time, affording the sensor a more thermally stable background. Non-scene radiation such as ambient heat emitted from the package or radiation of non-scene wavelengths may be sensed at the FPA. Due to the trend for smaller detectors, the close proximity of package walls and window to the FPA can result in non-scene heat causing a substantial increase in heat transfer from the package. This increase in heat can also be non-uniform, creating spatial noise within the FPA image as heat falls on different pixels of the FPA at different levels.

Prior attempts to overcome the problem of non-scene radiation being detected at the sensor have included pre-programming a variety of calibration settings for the ROIC that transfers signals from the FPA, each tailored to a specific package temperature range. As many as nine calibration settings have been employed, wherein the ROIC switches from one calibration setting to another as the package temperature and resulting heat flux on the FPA changes. As can be appreciated, this conventional approach adds cost and complexity.

SUMMARY OF THE PREFERRED EMBODIMENT

The foregoing and other problems are overcome, and other advantages are realized, in accordance with the presently preferred embodiments of these teachings. The inventors recognize that the re-calibration approach noted above merely manages the problem of non-scene radiation being sensed at the FPA rather than directly reducing its transfer to the sensor. The present invention seeks to limit the incidence of non-scene radiation on the sensor/FPA rather than correcting for it electronically after it has been sensed. It is an aspect of this invention to reduce non-scene conductive and radiative heat transfer to the radiation sensor/FPA to curtail degradation of the dynamic range of the detector.

In the preferred embodiment of the present invention, a radiation detector includes a base and a window that together define, at least in part, a vacuum chamber. An uncooled thermal sensor for generating a photoresistive current and an uncooled filter are disposed within the vacuum chamber such that the filter is disposed between the thermal sensor and the window. The detector further includes a heat extractor thermally coupled to the thermal sensor and to the filter, such as at least one TE cooling element that may be within or without the chamber and that acts as a common heat sink to both components. Preferably, the filter and the thermal sensor are maintained at substantially the same temperature when the detector is operating, which prevents or minimizes non-scene radiation being sensed at the sensor. Preferably, the filter is disposed less than or equal to about 0.1 inches from the sensor but not contacting the sensor, and further comprises a bandpass filter. Use of the term "filter" in the context of the present invention does not imply optical discrimination, though bandpass filtering is a non-limiting aspect of the invention. Rather, filter is a generic term that includes relative transparency to incident radiation without necessarily implying opacity to other radiation.

In another embodiment, a radiation detector includes a base, a window, a sensor for detecting thermal radiation, and at least one non-cryogenic heat extractor, such as a thermoelectric (TE) cooling element. The base and window define, at least in part, a vacuum chamber within which the sensor is disposed. The improvement includes a filter disposed within the vacuum chamber between the sensor and the window, and spaced a non-zero distance of less than or equal to about 0.1 inches from the sensor. The heat extractor preferably maintains the temperatures of the sensor and the filter within about 0.1 K of one another when the ambient temperature outside the detector is changed by five degrees, at least when the ambient temperature remains within the range 225 K to 350 K. The heat extractor may be one or more TE cooling elements and a stage that act as a common heat sink for both the sensor and the filter. Improved results are reported when the filter includes a bandpass filter in addition to the above characteristics.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

Figure 1:
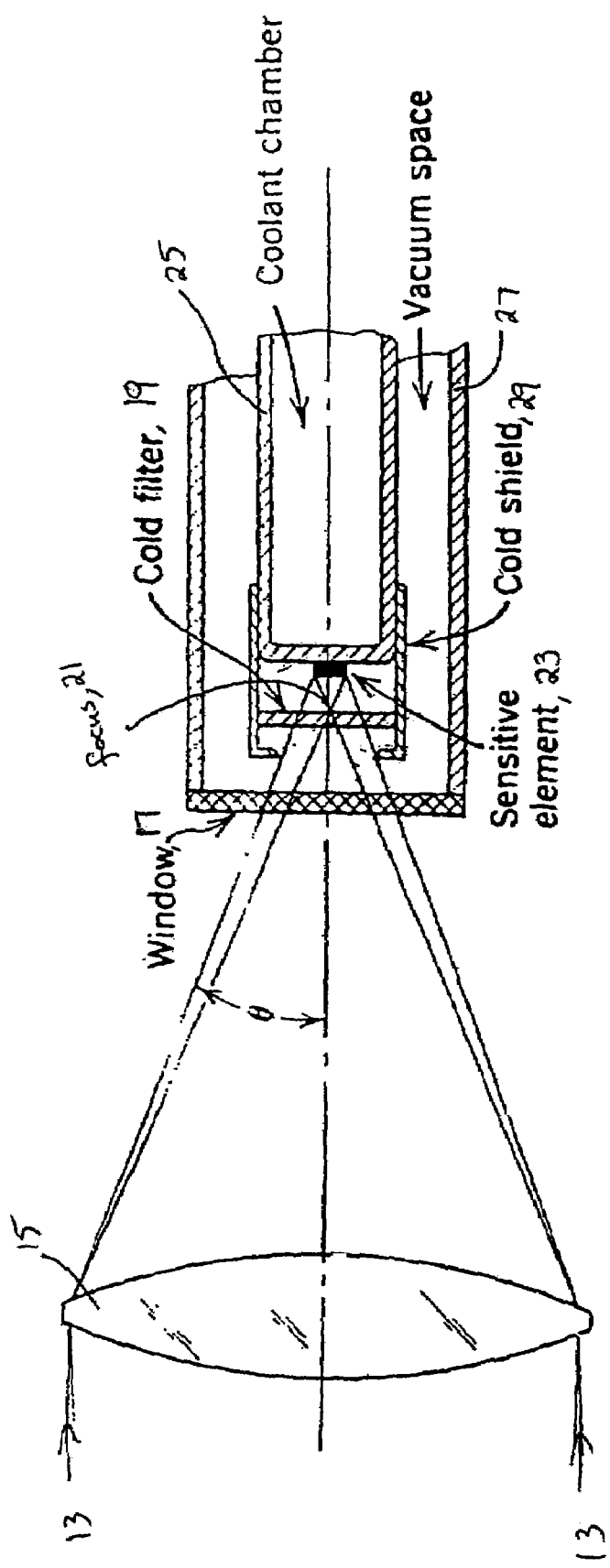
FIG. 1 is a prior art cryogenically cooled detector having a coldfilter.

Disposing a filter within a vacuum chamber of a cryogenically cooled radiation detector is known in the art, and is evident in the representative prior art cooled detector 11 shown in FIG. 1. Incident radiation 13 enters from the left through a lens 15 that directs the radiation 13 through a window 17 and a "coldfilter" 19 to one or an array of photon sensors 23. Typically, a focus 21 defined by the lens 15 is coincident with a surface of the coldfilter 19 so that the optical path diverges between the coldfilter 19 and the sensor 23, as depicted. The photon sensor 23 often lies directly on the end of a coldfinger 25 that circulates liquid nitrogen or other cryogenic coolant in the immediate vicinity of the photon sensor 23 to drive the sensor's temperature to about 77 K despite ambient temperatures around 300 K. Two separate enclosures are of interest. The coldshield, defined by coldshield walls 29 and the coldfilter 19, ensure a cryogenically controlled atmosphere around the photon sensor 23. The vacuum chamber, defined by the chamber walls 27 and the window 17, ensure a low pressure environment for the photon sensor 23. The two chambers are typically in pressure but not necessarily temperature equilibrium.

Coldfilters 19 used in prior art cryogenically cooled detectors 11 are typically cooled below a certain temperature threshold, generally about 120–150 K, that is sufficient to filter background radiation. This threshold is independent of the temperature of the photon sensor itself, which is generally about 77 K. That is, even if a photon sensor were made operable at a temperature of 300 K, the principal of operation behind prior art coldfilters would dictate that it be cooled to that same 120–150 K. A thermal gradient (typically in the 50–75 K range) between a prior art coldfilter and its associated (cryogenically cooled) photon sensor is acceptable because the targeted adverse background remains filtered yet additional cooling of the coldfilter does not increase sensitivity. Some early teachings suggest that the coldfilter and photon sensor be maintained at the same temperature.

Figure 2:
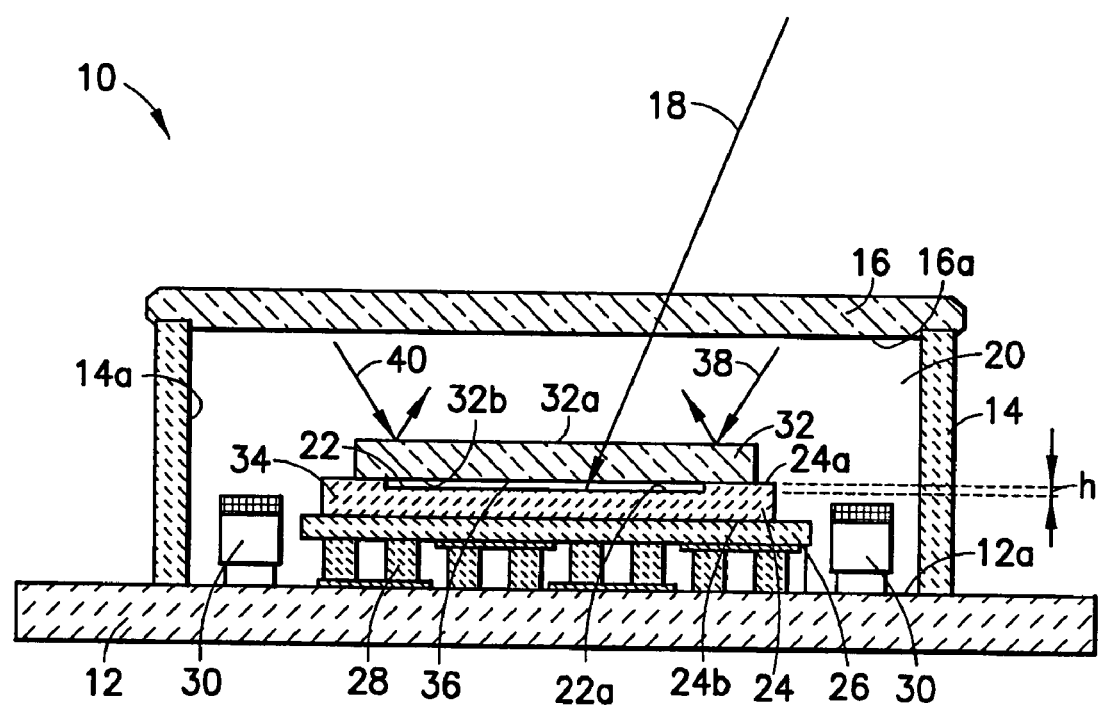
FIG. 2 is a sectional view of a radiation detector according to the preferred embodiment of the present invention.

FIG. 2 is a sectional view of a radiation detector 10 according to the preferred embodiment of the present invention. A base 12 is preferably a ceramic material and supports sidewalls 14, also preferably ceramic or alternatively other materials such as metals compatible with the base 12. The sidewalls 14 in turn support a window 16 that is transparent to the wavelengths of at least the expected scene radiation 18 to be sensed. The base 12 defines a base surface 12a, sidewalls 14 define a lateral interior surface 14a, and the window 16 defines a window interior surface 16a. The base surface 12a, the lateral interior surface 14a, and the window interior surface 16a together define a vacuum chamber 20. Within the vacuum chamber 20 is a radiation sensor such as a FPA 22 defining an incident surface or image plane 22a upon which scene radiation 18 impinges and is sensed. The FPA 22 is supported on a first surface 24a of a circuitboard substrate, such as a readout integrated circuit (ROIC) 24. An opposing surface 24b of the ROIC 24 is mounted to a thermal transfer substrate such as a ceramic stage 26. The ceramic stage 26 is supported above the base 12 by a series of thermoelectric (TE) elements 28 that are connected in electrical series and thermal parallel with one another. The TE elements 28 are preferably bismuth telluride (BiTe), although other suitable types of TE elements may be used. Alternatively, any other active or passive heat extractor may be used to remove heat that may be absorbed at the thermal sensor or array of sensors as is known or to be developed in the art. Adjacent to the ROIC 24 are a pair of getters 30.

Also disposed within the vacuum chamber 20 is a temperature controlled or temperature stabilized filter 32 supported between the FPA 22 and the window 16 by a mount 34. The terms temperature controlled and temperature stabilized each indicate a temperature of the filter is maintained within certain parameters by design, at least when the detector is within a designated operational range. Preferably, those parameters relate to the temperature of the thermal sensor so that a temperature gradient between the sensor and filter is limited. Alternatively, those parameters may be absolute temperature constraints within a certain ambient (outside the detector) temperature and pressure range.

The temperature controlled filter 32 defines an outwardly facing surface 32a nearest the window 16 and an inwardly facing surface 32b nearest the FPA 22. Preferably, the temperature controlled filter 32 is substantially transparent to the wavelengths of anticipated scene radiation but opaque (or at least less than fully transparent) to radiation of other wavelengths. Alternatively, the filter 32 need not discriminate by wavelength.

The mount 34 is in direct contact with the temperature controlled filter 32 and is preferably made in one piece with it. The mount 34 may be a protrusion of the temperature controlled filter 32 that supports it's inwardly facing surface 32b above the FPA image plane 22a (as in FIGS. 1–3), or it may be one or more separate components disposed between the temperature controlled filter 32 and the ROIC 24 (as in FIG. 4). The temperature controlled filter 32 is supported above the FPA 22 so as to define an interstitial gap 36 between the inwardly facing surface 32b of the temperature controlled filter 32 and the image plane 22a of the FPA 22. The interstitial gap 36 defines a height h that is greater than zero so that the temperature controlled filter does not lie directly on the image plane 22a of the FPA 22. Preferably, h≧0.0003 inches and most preferably h=0.001 inches. The temperature controlled filter 32 should be located as closely as possible to the image plane 22a of the FPA 22, so the height h should be designed to limit the heat transfer from the sidewalls 14 through any gaps between the FPA 22 and the filter 32. Typical values for h range from 0.0005 inches to 0.015 inches, but may be larger based on an evaluation of acceptable levels of heat transfer. It is anticipated that h equal to about 0.020 inches is an outer limit for most typical applications, absent further modification. It is calculated that h less than about 0.010 inches reduces heat transfer to the FPA sufficiently under conditions of ambient temperature (detector temperature) and pressure within the detector vacuum chamber that are commonly encountered.

Scene radiation 18 incident on the detector 10 passes through the window 16, into the vacuum chamber 20, through the temperature controlled filter 32, and impinges on the image plane 22a of the FPA 22, where it is sensed. The ROIC 24 relays an electrical signature of the scene radiation 18 through bondwires and electrical connections (not shown) in the base 12 to further apparatus (not shown) external to the detector 10. The temperature controlled filter 32 is preferably opaque to window radiation 38 by means of a bandpass filter. A bandpass filter is a filter that blocks or absorbs incident radiation except that of an identifiable frequency range out of a direct beam of radiation. The bandpass filter is preferably a coating on the outward 32a and inward 32b facing surfaces of the temperature controlled filter 32. For example, a bandpass filter that allows transmission only of wavelengths 8 µm≦λ≦12 µm will include a coating on the outward facing surface 32a that reflects all wavelengths greater than 12 µm, and a coating on the inward facing surface 32b that reflects all wavelengths less than 8 µm. The above-listed order of the coatings may be reversed. Alternatively, the bandpass filter may be made of multiple layers that each absorb energy of specific wavelengths to achieve the desired filtering effect, it may be made intrinsic with the temperature controlled filter 32, or it may be a separate component disposed between the window 16 and the temperature controlled filter 32. Emitted window radiation 38 is reflected away from the FPA 22 by the temperature controlled filter 32. Ambient heat from outside the detector 10 is absorbed by the detector base 12, sidewalls 14 and window 16. This absorbed energy is transmitted to the vacuum chamber 20 as package conduction 40. Package conduction 40 is transferred throughout various surfaces within the vacuum chamber 20 by gas molecules therein.

Modeling of heat transfer by a gas is generally divided into three regimes based on the gas pressure: viscous flow, molecular flow, and a transition regime between them. Viscous flow dominates in higher pressure environments, generally greater than about one Torr, and is characterized in that the means free path of the gas molecules is small compared to the cross section of the chamber or duct that contains the molecules. The abundance of molecules in a higher pressure environment ensures they bounce from one another multiple times in moving from one chamber wall to another. Molecular flow dominates below about 0.1 Torr, and is characterized in that the mean free path of molecules is on the same order of magnitude as the chamber cross section, or larger. Molecules move from one chamber wall to another largely unobstructed by other molecules due to the low gas pressure.

A bolometer vacuum chamber falls within the molecular flow regime, so gas transfer of heat within the vacuum chamber is very efficient. A thermal FPA or sensor is highly sensitive to such heat transfer from the chamber walls or window, which it senses as noise. The temperature controlled filter 32 prevents gas molecules within the vacuum chamber 20 from efficiently raising the temperature of the FPA 22 by preventing ready access of those molecules to the image plane 22a. That is, the filter 32 serves as a physical obstruction so that a molecule (or at least a statistically large majority of them) absorbing heat from a chamber wall or window cannot carry that heat to the FPA 22 without first bouncing off the filter 32 or another object (e.g., the stage). Each bounce transfers that heat from the molecule, and reduces the efficiency with which it can carry noise in the form of heat to the FPA 22. Due to the small size h of the interstitial gap 36 between the FPA 22 and the temperature controlled filter 32, even gas molecules within that gap 36 generally are not carrying heat from the sidewalls 14 or window 16 but have transferred it to the ROIC 24 or to the filter 32 before reaching the FPA 22. The temperature controlled filter 32 imposes a physical and thermal barrier to those gas molecules that carry package conduction 40. This further isolates the FPA 22 from non-scene radiation 38,40 without degrading the incidence of scene radiation 18. In the preferred embodiment of the present invention, the temperature controlled filter 32 and the FPA 22 are in substantial thermal equilibrium, thereby impeding heat flow between the temperature controlled filter 32 and the FPA 22.

The composition of the temperature controlled filter 32 is specific to the scene radiation desired to be sensed. For desired scene radiation of wavelengths 8 µm≦λ≦12 µm, a temperature controlled filter 32 constructed of germanium having a thickness in the range of about 0.020 to about 0.040 inches has proven effective. The temperature controlled filter 32 is heat sunk to the ROIC 24 by the mount(s) 34 that may or may not be made in one piece with the temperature controlled filter 32, so that the temperature of the FPA 22 and the temperature controlled filter 32 preferably remain substantially (within about 3 K) the same. In a preferred embodiment, the sensor/FPA 22 and the filter 32 are within about 1 K or one another, and in a most preferred embodiment, they are within about 0.1 K of each other. Thermal sensors 22 typically exhibit sensitivity to about 0.01 K and heat transfer due to radiation is a function of $T^4$, so slight temperature changes can have a significant effect on heat transfer.

Because the ROIC 24 is heat sunk to the TE elements 28, by extension the temperature controlled filter 32 is also heat sunk to those same TE elements 28. Even in the non-optimal condition where the temperature of the filter 32 remains above that of the FPA 22, the differential remains relatively constant over broader ranges of window radiation 38 and package conduction 40. This reduces both spatial and transient temperature fluctuations at the image plane 22a of the FPA 22 due to noise or non-scene radiation 38, 40, allowing a single calibration of the ROIC to offset any (relatively stable) temperature disparity between the temperature controlled filter 32 and the FPA 22.

Figure 3:
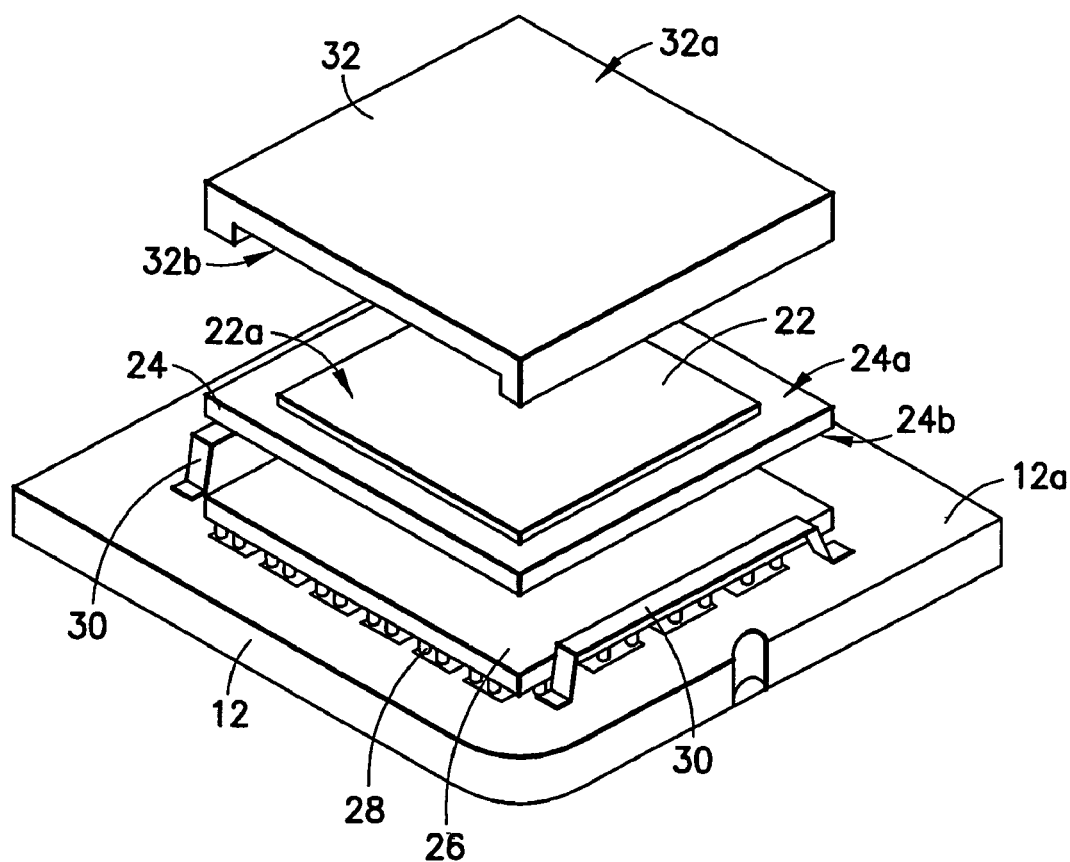
FIG. 3 is an exploded view of a radiation detector according to the preferred embodiment of the present invention.

FIG. 3 is an exploded view of a radiation detector according to the preferred embodiment of the present invention, but without depicting the sidewalls or window for clearer illustration of more notable components. Similar to FIG. 1, the FPA 22 is mounted to a ROIC 24, which is itself disposed on a ceramic stage 26. A series of TE elements 28 lie between the ceramic stage 26 and the base 12, and a pair of getters 30 are affixed to the base 12 and flank the ROIC 24. The temperature controlled filter 32 lies adjacent to the first surface 24a of the ROIC 24, which is opposite the ceramic stage 26. FIG. 3 makes evident that the FPA 22 lies on or is integrated with the ROIC 24. In this embodiment, the outboard portions of the temperature controlled filter 32 that fall below the outwardly facing surface 32b of the filter 32 are the mounts 34, so that the interstitial gap 36 defines a separate cavity within the vacuum chamber 20 (FIG. 1) when the detector 10 is assembled. The TE elements 28, the ceramic stage 26, and the ROIC 24 each act as a heat sink for the FPA 22 and the temperature controlled filter 32 because each are connected to the FPA and the temperature controlled filter via a thermally conductive pathway. The ROIC 24 may be termed the first common heat sink because it is the first common component along the thermally conductive pathway beginning with the FPA 22 and that beginning with the temperature controlled filter 32.

Figure 4:
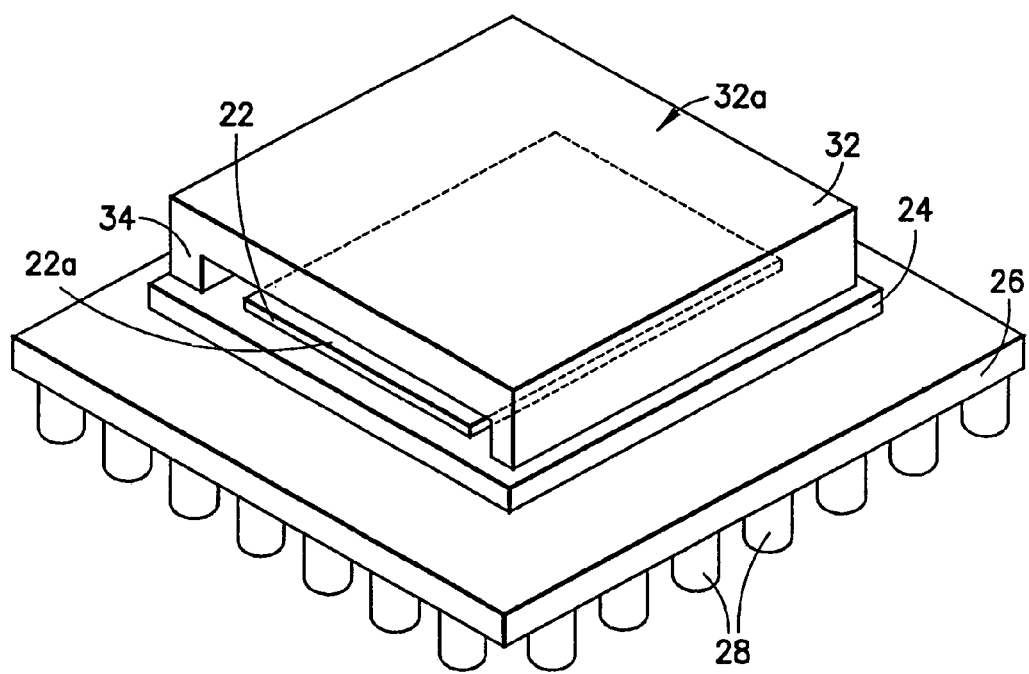
FIG. 4 is a perspective view of the temperature controlled filter in relation to other internal components of a detector, wherein the mounts are components separate from the ROIC.

FIG. 4 is a perspective view of the temperature controlled filter 32 in relation to other internal components of a detector 10, wherein the mounts 34 are components separate from the temperature controlled filter 32. In this embodiment, the mounts 34 are disposed between the FPA 22 and the temperature controlled filter 32 and are mounted directly to the ROIC 24. The FPA 22 lies on the ROIC 24, which acts as the first common heat sink to the temperature controlled filter 32 and the FPA 22. The ceramic stage 26 and the TE elements 28 are also heat sinks to the temperature controlled filter 32, the FPA 22, and the ROIC 24.

Uncooled detectors according to the present invention differ from prior art cryogenic detectors employing "coldfilters". A more detailed recitation of prior art coldfilters may be found in commonly assigned U.S. Pat. No. 4,820,923. Prior art cooled detectors generally include a coldfinger that maintains a sensor at about 77 K. The sensor is disposed at a rearward end of a vacuum chamber or Dewar opposite the coldfilter. Coldfilters of prior art cooled IR detectors are generally spaced from the sensor or imaging plane by about two inches or more due to optical considerations, and often serve as the Dewar window that defined the portion of the vacuum chamber furthest from the sensor. Cooled sensors may use one or more lenses along the optical path forward of the coldfilter in an uncooled portion of the detector, and the coldfilter acts as an aperture of the optical system. Incident radiation focused by the uncooled lenses passes through the coldfilter aperture prior to impinging upon the imaging plane. A coldfilter of the prior art could not be located in close proximity to the imaging plane of the sensor due to deleterious optical results. This aspect largely serves as a lower limit on the size of cooled IR detectors.

Additionally, while both the sensor and the coldfilter of the prior art are generally both heat sunk to the coldfinger, the sensor and coldfilter are usually not maintained at substantially the same temperature for at least two reasons. First, the distance between the sensor and the coldfilter noted above necessarily imposed a large difference in heat conduction pathways to the coldfinger, which is generally located immediately behind the sensor. In the present invention, the thermal pathway from the filter to the heat sink is substantially equal to that from the sensor to the heat sink. Second, the inventors are unaware of a practical advantage in maintaining those two components at the same temperature, whereas certain design considerations garner against a cooled detector that purposefully achieves temperature equivalence between the filter and photon sensor. Specifically, photon sensors impose certain optical considerations noted above in order to manipulate incident beams to trigger a cascade or avalanche effect. So long as the coldfilter is cooled below a value wherein the heat signal to the sensor is less than the signal value of the incident photons, the coldfilter operates properly. For example, a sensor cooled to 77 K would operate satisfactorily where the coldfilter is cooled to only 120 K, and sensitivity is not improved by further cooling of the coldfilter below that threshold where it sufficiently filters background radiation. In addition, fast cool down time and low steady-state heat load are important parameters for cooled IR detectors, since the cryogenic cooling apparatus remains a major limitation. Cooling of the coldfilter to temperatures that do not further enhance sensitivity adversely affects both parameters.

Conversely, uncooled detectors use thermal sensors that sense a heat-induced change in resistance resulting from incident radiation, rather than a photon sensor that senses incident radiation directly as photons that are multiplied by an avalanching process. Maintaining a thermally controlled or thermally stabilized filter in an uncooled detector at a steady temperature differential to that of the sensor (as in cooled detectors with photon sensors discussed above) results in a constant level of thermal noise at the sensor. This is true whether the filter is warmer or colder than the thermal sensor. Unlike cryogenically cooled detectors with photon sensors, there is a sensitivity gain to be achieved in an uncooled bolometer by maintaining a coldfilter temperature equal to that of the sensor. Where a coldfilter for a photon sensor is optimized when operated just below a threshold temperature that is typically well above the sensor temperature, the present invention optimizes a temperature controlled filter for a thermal sensor by minimizing a temperature differential between the filter and the thermal sensor. Additional gains are achieved by disposing the filter of the present invention in extremely close proximity to the thermal sensor.

The present invention is most advantageous when used in conjunction with an infrared detector 10, whether scene radiation is in a near IR region (wavelengths $0.7 \, \mu m \leq \lambda \leq 1.5 \, \mu m$), an intermediate IR region ($1.5 \, \mu m \leq \lambda \leq 20 \, \mu m$) or a far IR region ($20 \, \mu m \leq \lambda \leq 300 \, \mu m$). It can also be employed in detectors sensitive to radiation of any wavelength, as the present invention is not in itself wavelength dependent. So long as a radiation detector can measure scene radiation 18, the present invention may be employed in detectors 10 sensitive to radiation in the visible, ultraviolet, X-ray and gamma-ray regions as well as regions wherein scene radiation 18 is defined by wavelengths longer than the IR region, such as microwaves, for example. However, most applications are anticipated to be for wavelengths between 1.5 and 20 µm, but extending up to about 40 µm for certain space-based uses.

In order to optimize a particular temperature controlled filter 32 to a particular detector 10, or to measure the improvements offered by a detector with a temperature controlled filter 32 versus one without, a housing response HR is measured and compared to a scene response SR for each detector to be compared. The ratio of HR to SR (or alternatively SR to HR) is a measure of susceptibility of a particular detector 10 to changes in ambient temperature that can be readily compared to similar ratios of other detectors 10.

HR is a measure of heat transfer from outside the detector 10 (ambient temperature) to the FPA 22, and is preferably as close to zero as possible. Measurements are taken with the detector 10 placed in a thermal chamber and a calibrated blackbody filling an F/1 aperture plate. The blackbody temperature is held constant while the ambient temperature in the thermal chamber is changed. Any temperature change at the FPA image plane 22a (which is measured as detector video response) represents only non-scene radiation, and is the HR. SR is measured using the same thermal chamber and blackbody, and is a measure of only scene radiation. For measuring SR, ambient temperature in the thermal chamber is held constant while the blackbody temperature is changed. The resultant temperature change at the FPA image plane 22a is the SR. It is desirable to have a lower ratio of HR/SR since HR represents non-scene radiation, or noise.

Four different detectors 10, identified below by unique serial numbers (S/N), were analyzed. Parameters and HR/SR ratios for the various detectors 10 are reproduced below. Each employed an identical detector with only differences in filters. S/N 144 employed no bandpass filter but only an anti-reflective coating on the window 16. S/N 161 and 164 employed a bandpass filter on the window 16. S/N 223 employed a temperature controlled filter 32 with bandpass filter that was heat sunk to the ROIC 24, and only a reflective coating on the window 16. As tested, all bandpass filters were transparent only for 8 μm $\leq \lambda \leq$ 12 μm. HR and SR are each expressed below in units of analog to digital (A/D) counts per temperature change in degree centigrade.

| Detector | Parameters | HR | SR | HR/SR |
|---|---|---|---|---|
| S/N 144 | | | | 7.0 |
| S/N 161 | 8 pF, 15 μsec | 59.1 | 17.0 | 3.5 |
| S/N 164 | 4 pF, 15 μsec | 131 | 43.8 | 3.0 |
| S/N 223 | 8 pF, 15 μsec | 21.6 | 15.3 | 1.4 |

Comparing the HR/SR ratios of S/N 144 to S/N 223 shows a five-fold improvement in housing response to scene response. Comparing the HR/SR ratios of S/N 161 or S/N 164 to S/N 223 shows a two-fold improvement in moving the bandpass filter from the package window 16 to a temperature controlled filter 32 that was heat sunk to the ROIC 24. In addition, nonuniformities in response across the focal plane array induced by ambient temperature changes (known in the art as 'smiley' due to the look of the plotted data) were reduced by a factor of four in S/N 223 as compared to S/N 161 or S/N 164. S/N 223 shows its greatest advantage over other tested detectors 10 in HR, tending to confirm that the temperature controlled filter 32 with bandpass filter prevents much of the non-scene radiation from reaching the FPA 22.

Figure 5A:
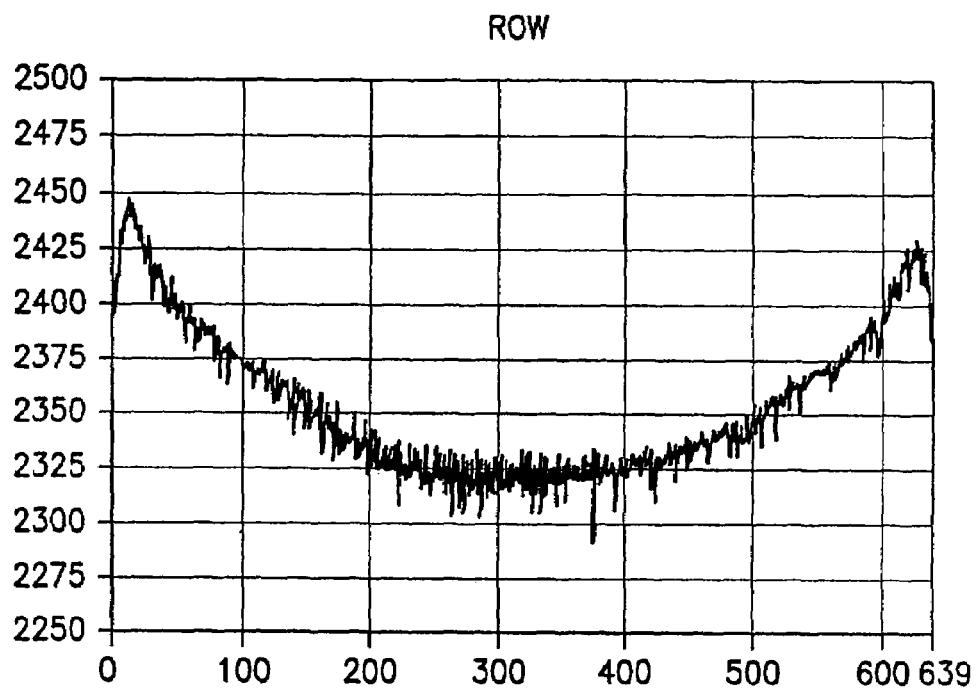
FIG. 5A is a graph of video row 120 of field 1 for S/N 161, with pixel number on the horizontal scale and analog to digital (A/D) counts on the vertical scale.
Figure 5B:
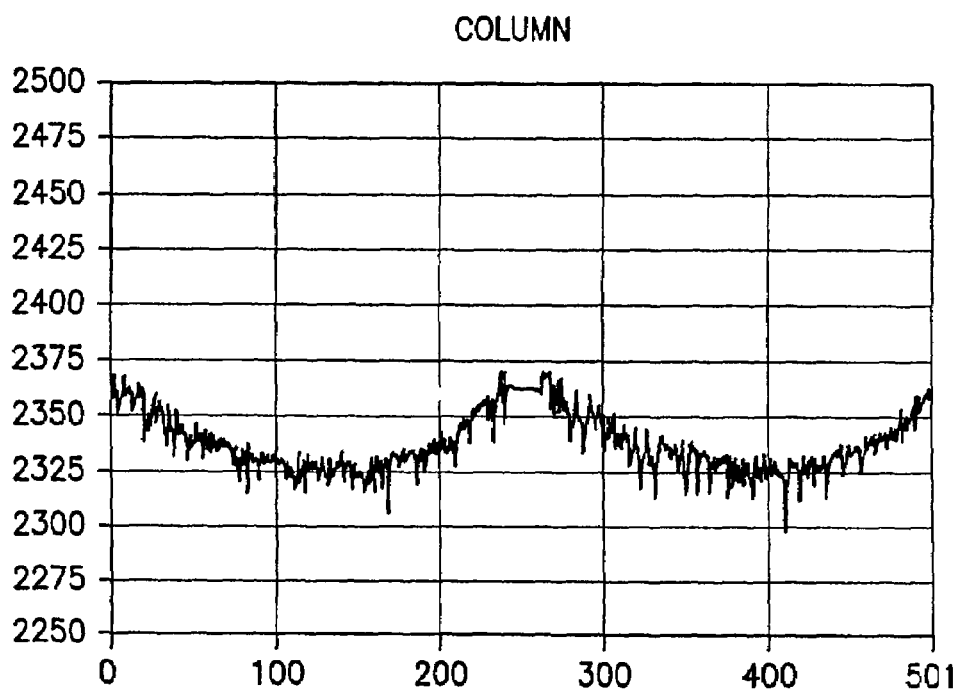
FIG. 5B is a graph of video column 320 of field 1 for S/N 161, with pixel number on the horizontal scale and A/D counts on the vertical scale.

FIGS. 5A–5B represent data from S/N 161, a detector 10 with a bandpass filter on the package window 16. Ambient temperature within the thermal chamber was raised 5.1° C. in this experiment. The grid pattern in the data is due to mapping and does not represent the data itself. FIG. 5A is a graph of video row 120 of field 1, with pixel number on the horizontal scale and A/D counts on the vertical scale. Smiley as measured across row 120 spans approximately 100 ana-log-digital converter (A/D) counts for this detector. FIG. 5B is a graph of video column 320 of field 1, with pixel number on the horizontal scale and A/D counts on the vertical scale. Smiley across column 320 spans approximately 50 A/D counts.

Figure 6A:
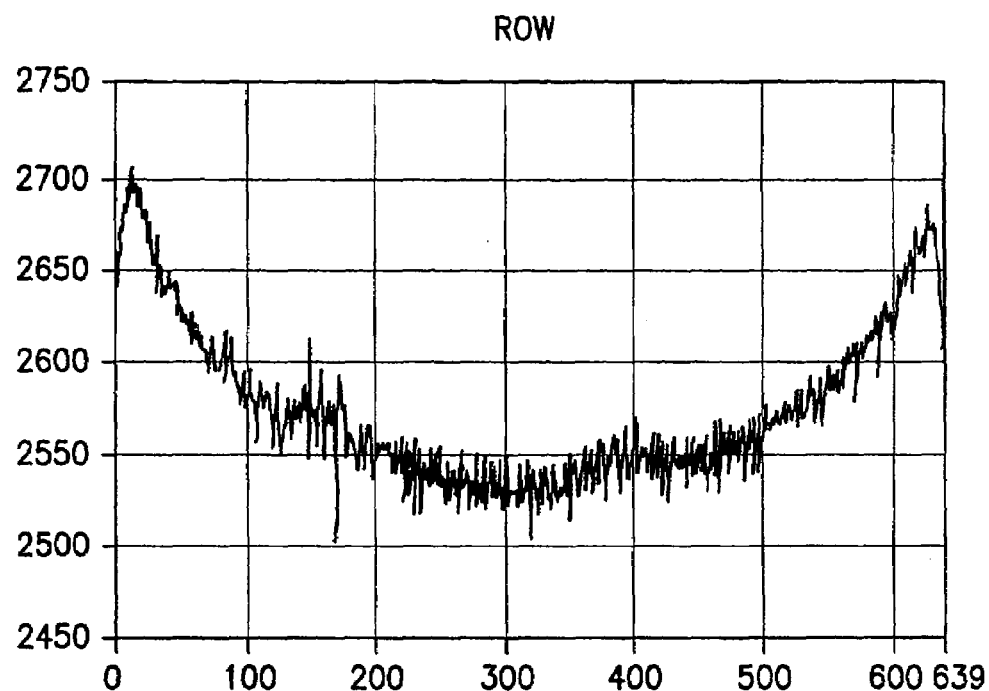
FIGS. 6A–6B are graphs similar to FIGS. 5A–5B for detector S/N 164.
Figure 6B:
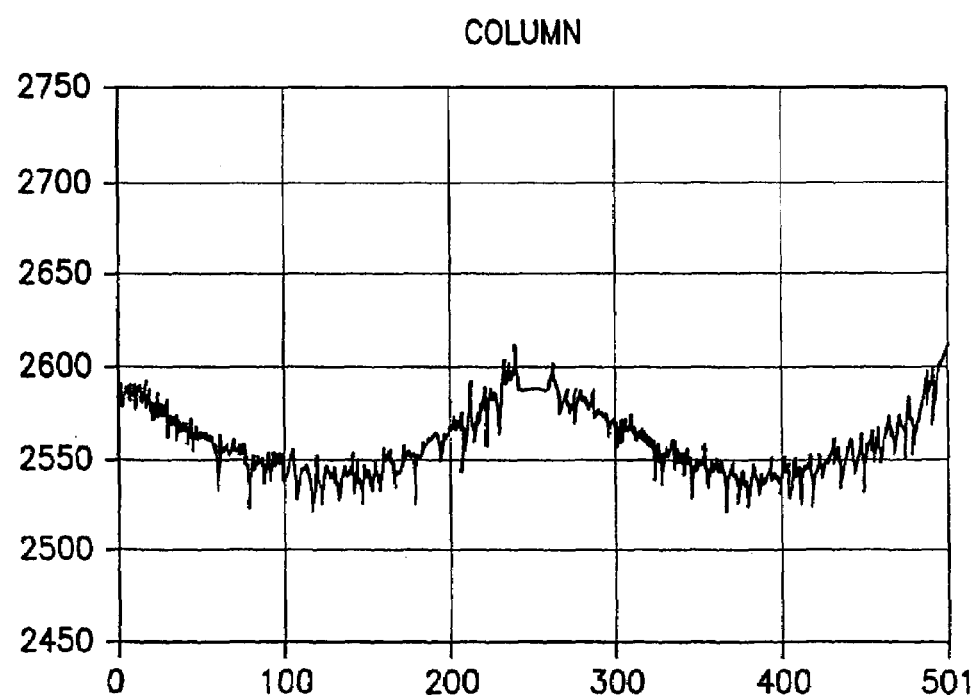

FIGS. 6A–6B represent data from S/N 164, the other detector 10 with a bandpass filter on the package window 16. Ambient temperature within the thermal chamber was raised 4° C. in this experiment. FIG. 6A is a graph of video row 120 of field 1 similar to FIG. 5A. Smiley as measured across row 120 of S/N 164 spans approximately 150 A/D counts, somewhat more than S/N 161. FIG. 6B is a graph of video column 320 of field 1, similar to FIG. 5B. Smiley across column 320 for S/N 164 spans approximately 50 A/D counts, similar to S/N 161.

Figure 7A:
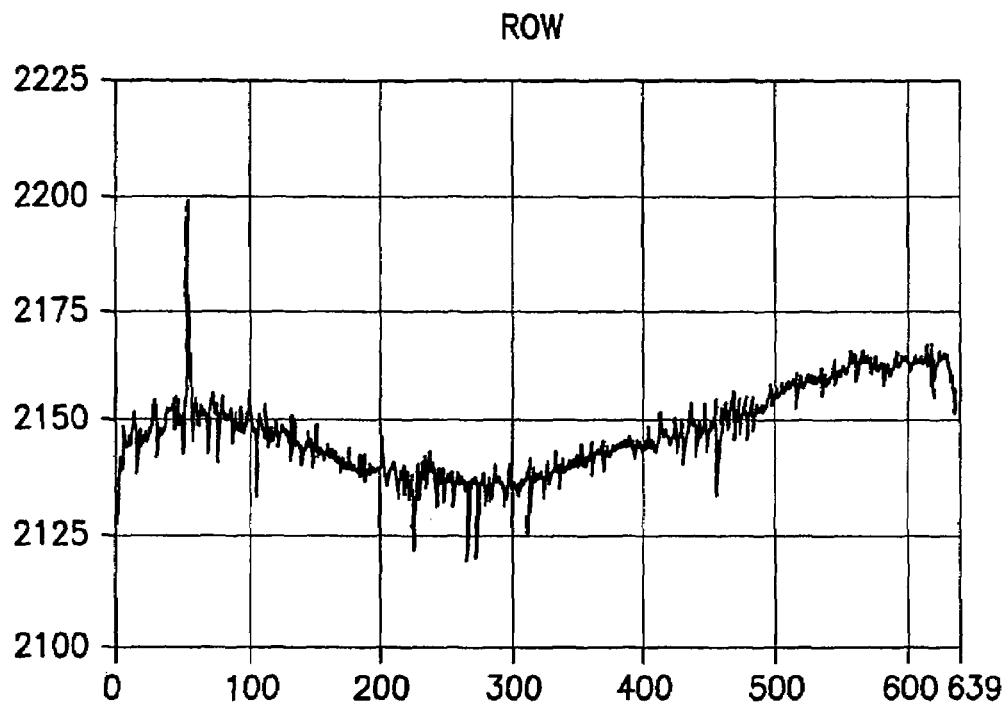
FIGS. 7A–7B are graphs similar to FIGS. 6A–6B for detector S/N 223.
Figure 7B:
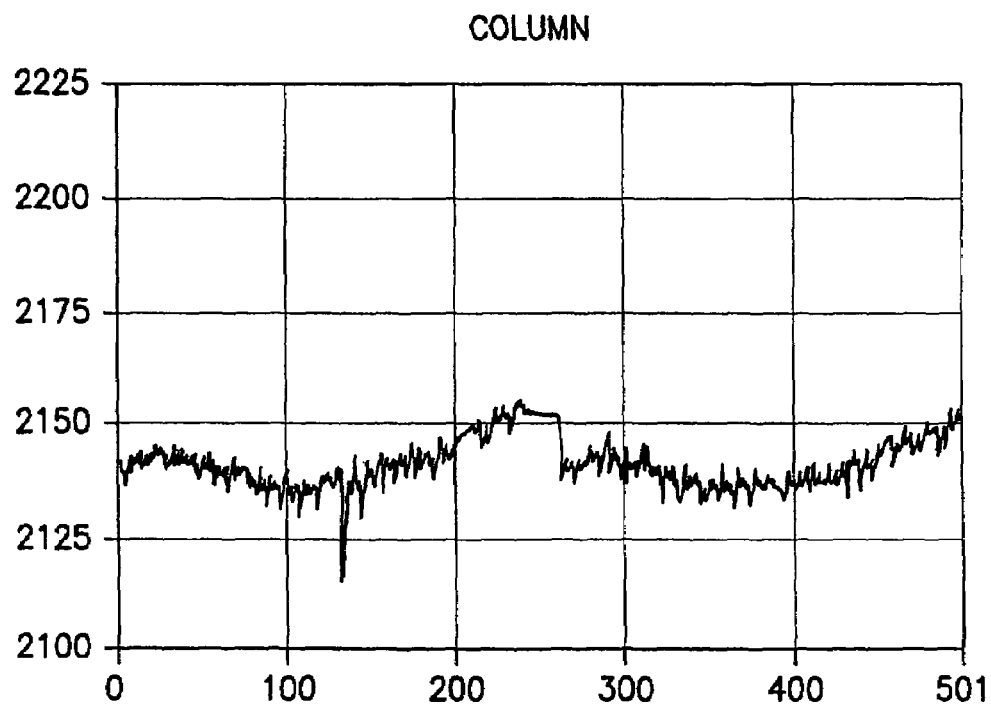

FIGS. 7A–7B represent data from S/N 223, the detector 10 employing a temperature controlled filter 32 according to the present invention that is heat sunk to the ROIC 24 and that further incorporates a bandpass filter. Ambient temperature in the thermal chamber was raised 4° C. in this experiment, exactly the same as for S/N 164. FIG. 7A is a graph similar to FIG. 5A. Smiley as measured across row 120 of S/N 223 spans approximately 50 A/D counts (ignoring the spike at pixel no. 50). FIG. 7B is a graph similar to FIG. 5B. Smiley across column 320 for S/N 223 spans approximately 25 A/D counts. Both row and column improvements in smiley represent a two-fold improvement over S/N 164, the next best tested detector 10.

Figure 8A:
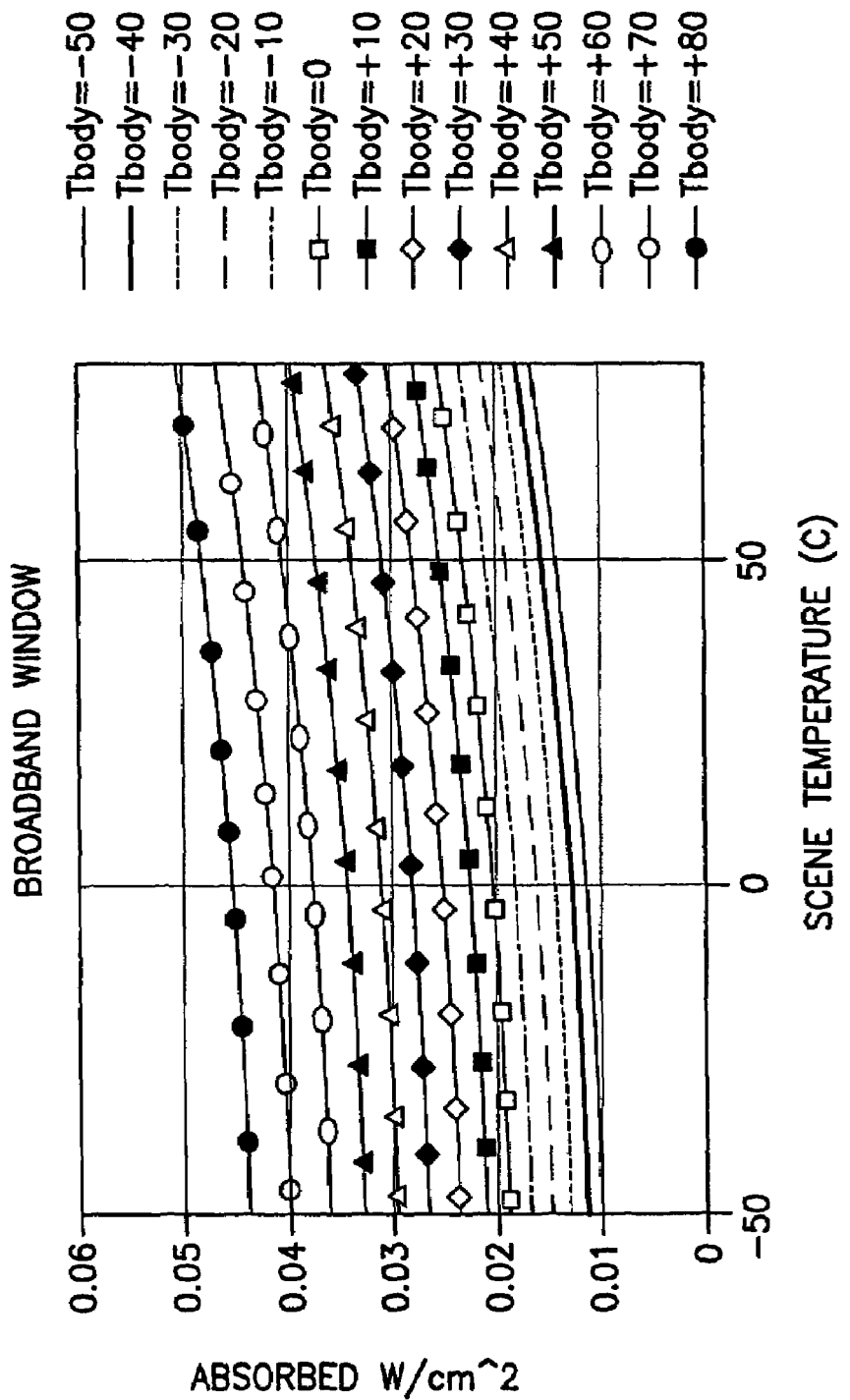
FIG. 8A is a graph of absorbed power per FPA area versus blackbody temperature for various detector housing temperatures where no wavelength filter is used.
Figure 8B:
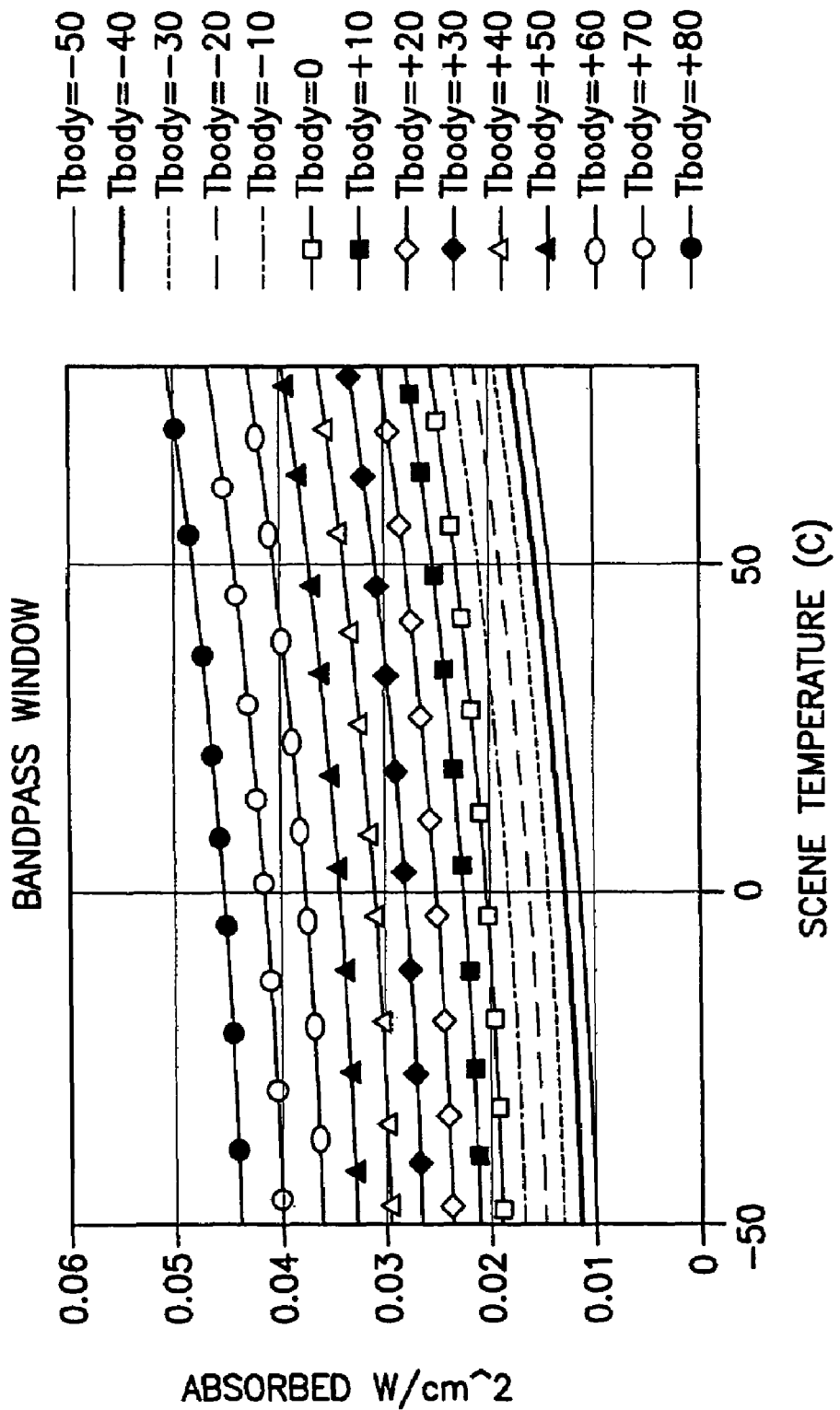
FIG. 8B is a graph of absorbed power per FPA area versus blackbody temperature for various detector housing temperatures where a bandpass filter is on the housing window.
Figure 8C:
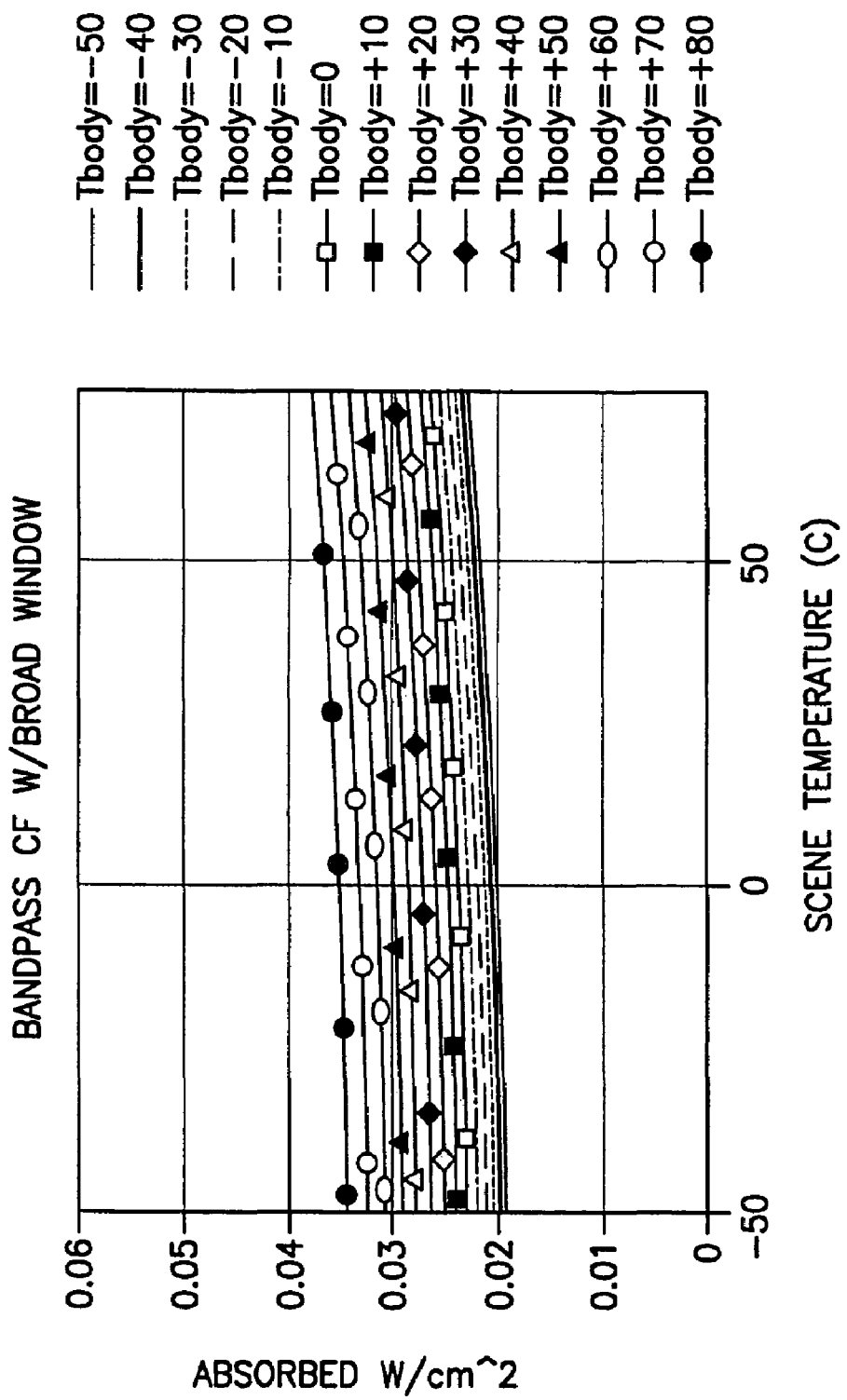
FIG. 8C is a graph of absorbed power per area of the FPA versus blackbody temperature for various detector housing temperatures where a bandpass filter on a temperature controlled filter of the present invention and no bandpass filter on the housing window.

FIGS. 8A–8C are calculated graphs of absorbed power per area of the FPA image plane 22a (Absorbed W/cm$^2$) versus blackbody temperature (Scene Temperature, ° C.) for various filter configurations, each graph depicting various detector housing temperatures (Tbody, in ° C.).

FIG. 8A illustrates the profile for a detector 10 with no bandpass filter. Detector housing temperatures vary from −50° C. to 80° C., and scene temperature varies along the horizontal scale over approximately the same range. Where neither bandpass filtering nor a temperature controlled filter 32 is used, power flux ranges approximately from 0.01 W/cm$^2$ to 0.05 W/cm$^2$. FIG. 8B displays the profile for a detector 10 with a bandpass filter on the housing window 16. Over the same temperature differentials, power flux ranges approximately from 0.015 W/cm$^2$ to 0.045 W/cm$^2$. FIG. 8C shows the profile for a detector 10 with a bandpass filtering temperature controlled filter 32 according to the present invention. Over the same temperature differentials as in FIGS. 8A and 8B, power flux ranges from approximately 0.02 W/cm$^2$ to 0.038 W/cm$^2$. This represents roughly a 50% improvement over a detector with a bandpass filter on the package window 16 and no temperature controlled filter 32, and agrees well with measured data from FIGS. 4–6. Each line of constant detector body temperature defines a more shallow slope than similar lines in FIG. 8A or 8B, indicating the detector 10 of FIG. 8C is more thermally stable over a variety of ambient temperatures. Additionally, the spacing between lines of different detector body temperatures is more closely packed than that of FIG. 8A or 8B, indicating that even when the detector body of FIG. 8C absorbs heat from whatever source, less heat is transferred to the FPA 22 as compared to the two detectors without the bandpass temperature controlled filter 32.

While described in the context of presently preferred embodiments, those skilled in the art should appreciate that various modifications of and alterations to the foregoing embodiments can be made, and that all such modifications and alterations remain within the scope of this invention. Examples herein are illustrative and not exhaustive.

What is claimed is:

1. A radiation detector comprising:
   a base and a window defining at least in part a vacuum chamber;
   an uncooled thermal sensor disposed within the vacuum chamber;
   an uncooled filter disposed within the vacuum chamber between the thermal sensor and the window; and
   a heat extractor thermally coupled to said thermal sensor and to said filter, wherein said filter and said sensor are disposed in proximity to one another so as to substantially impede transfer of heat from surfaces of the vacuum chamber to an incident surface of the sensor in a molecular gas flow regime.

2. The radiation detector of claim 1 wherein the heat extractor comprises a common heat sink to which each of the thermal sensor and filter are thermally coupled.

3. The radiation detector of claim 2 wherein the common heat sink comprises at least one thermo-electric (TE) element.

4. The radiation detector of claim 3 wherein the TE element is disposed within the vacuum chamber.

5. The radiation detector of claim 1 wherein the heat extractor operates to maintain the filter and the thermal sensor at substantially the same temperature.

6. The radiation detector of claim 1 wherein the incident surface is spaced from the filter a non-zero distance h.

7. The radiation detector of claim 6 wherein h is less than or equal to about 0.1 inches.

8. The radiation detector of claim 6 wherein h is less than or equal to about 0.01 inches.

9. The radiation detector of claim 6 wherein h is less than or equal to about 0.02 inches.

10. The radiation detector of claim 1 wherein the thermal sensor is an array of sensors coupled to a readout integrated circuit (ROIC), the filter is coupled to the ROIC by at least one mount, and the heat extractor is coupled to the sensor and filter through the ROIC.

11. The radiation detector of claim 10 wherein the mount is made in one piece with the ROIC.

12. The radiation detector of claim 1 wherein the filter comprises a bandpass filter.

13. The radiation detector of claim 12 wherein the bandpass filter comprises a first coating disposed on at least one surface of the filter.

14. The radiation detector of claim 1 wherein the filter comprises a bandpass filter that is substantially transparent to radiation defined by wavelengths $\lambda$ between about 0.7 μm and about 300 μm.

15. The radiation detector of claim 14 wherein $\lambda$ is between about 1.5 μm and about 20 μm.

16. In a radiation detector comprising a base, a window, a sensor for detecting thermal radiation, and at least one non-cryogenic heat extractor, wherein the sensor is disposed within a vacuum chamber defined at least in part by the base and the window, the improvement comprising:
   a filter disposed within the vacuum chamber between the sensor and the window and spaced from the sensor a non-zero distance h that is less than or equal to about 0.1 inches.

17. The radiation detector of claim 16 wherein a pressure within the vacuum chamber is less than or equal to about 0.02 torr.

18. The radiation detector of claim 16 wherein the filter comprises a bandpass filter.

19. The radiation detector of claim 16 wherein the heat extractor acts as a heat sink to both the filter and the sensor.

20. The radiation detector of claim 19 wherein the heat extractor comprises a stage and at least one thermoelectric cooling element disposed between the base and the sensor.

21. The radiation detector of claim 19 wherein the heat extractor operates to maintain a temperature of the sensor and of the filter within about 0.1 K of one another when an ambient temperature outside the detector changes five degrees within the range 225 K to 350 K.

22. The radiation detector of claim 16, wherein h that is less than or equal to about 0.02 inches.

* * * * *